April 9, 1940.　　　E. G. BAILEY　　　2,196,889
STEAM GENERATOR
Filed July 1, 1936　　　8 Sheets-Sheet 1

INVENTOR.
Ervin G. Bailey
BY
ATTORNEY.

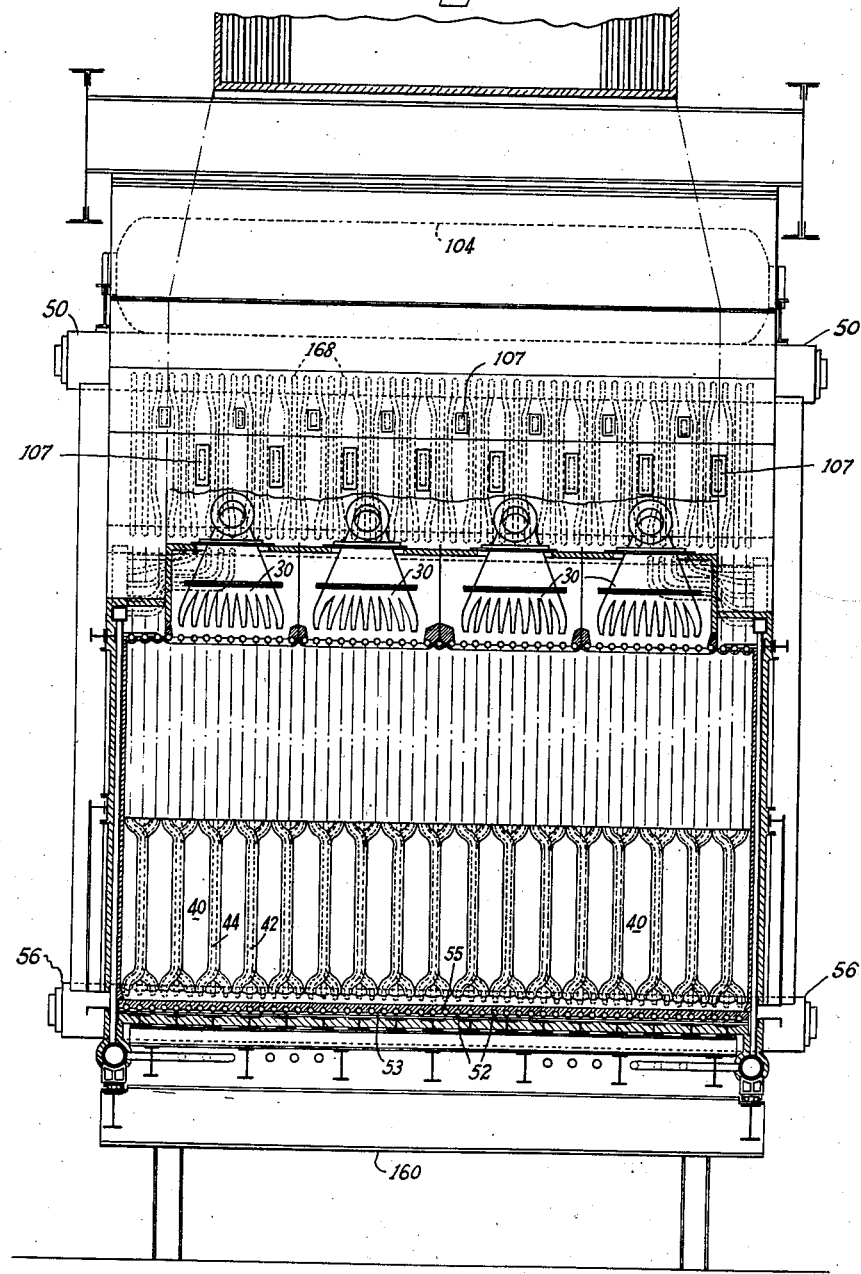

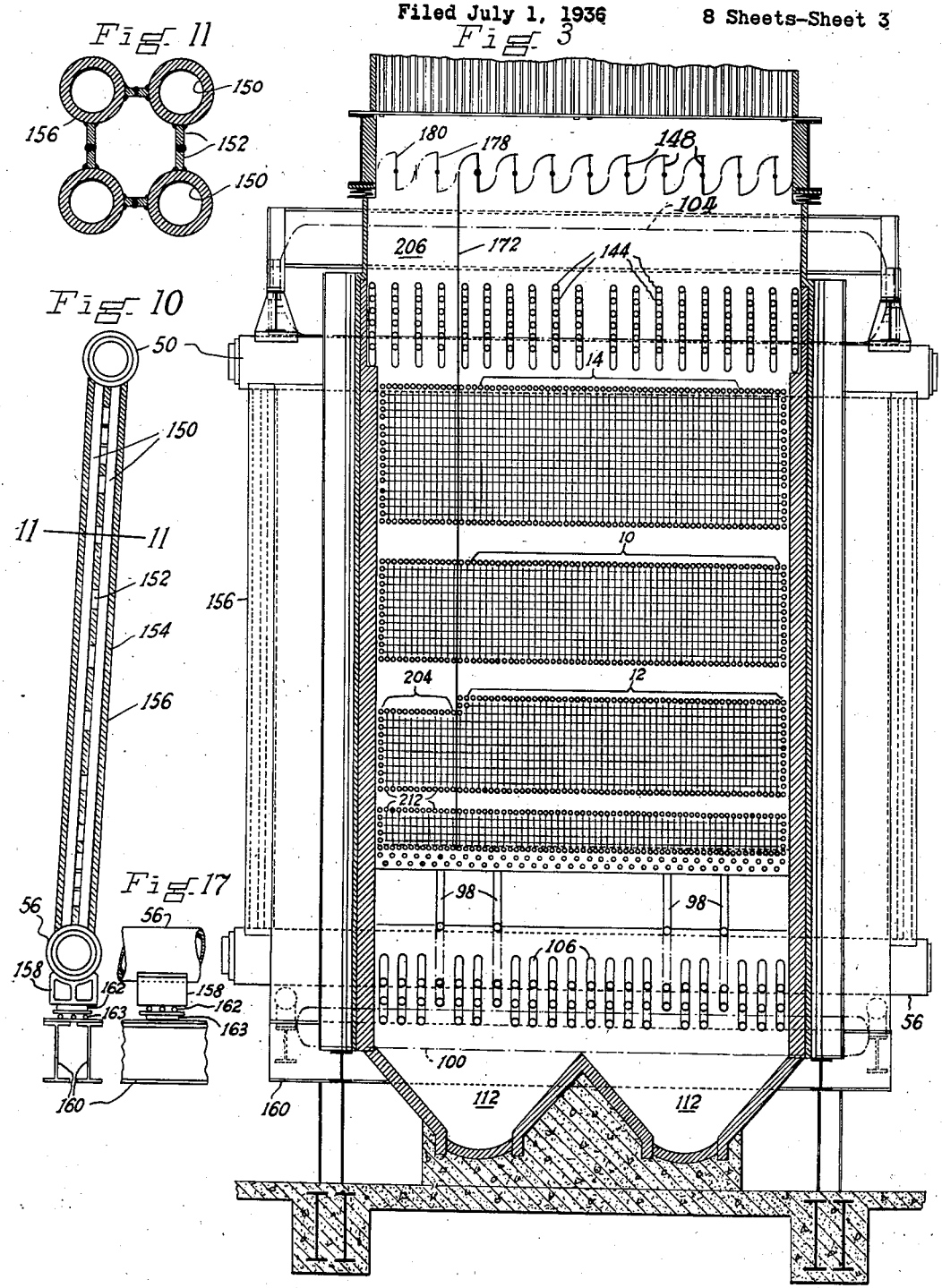

April 9, 1940.  E. G. BAILEY  2,196,889
STEAM GENERATOR
Filed July 1, 1936   8 Sheets-Sheet 4

INVENTOR.
Ervin G. Bailey
BY
ATTORNEY.

April 9, 1940.  E. G. BAILEY  2,196,889
STEAM GENERATOR
Filed July 1, 1936   8 Sheets-Sheet 5

INVENTOR.
Ervin G. Bailey
BY
ATTORNEY.

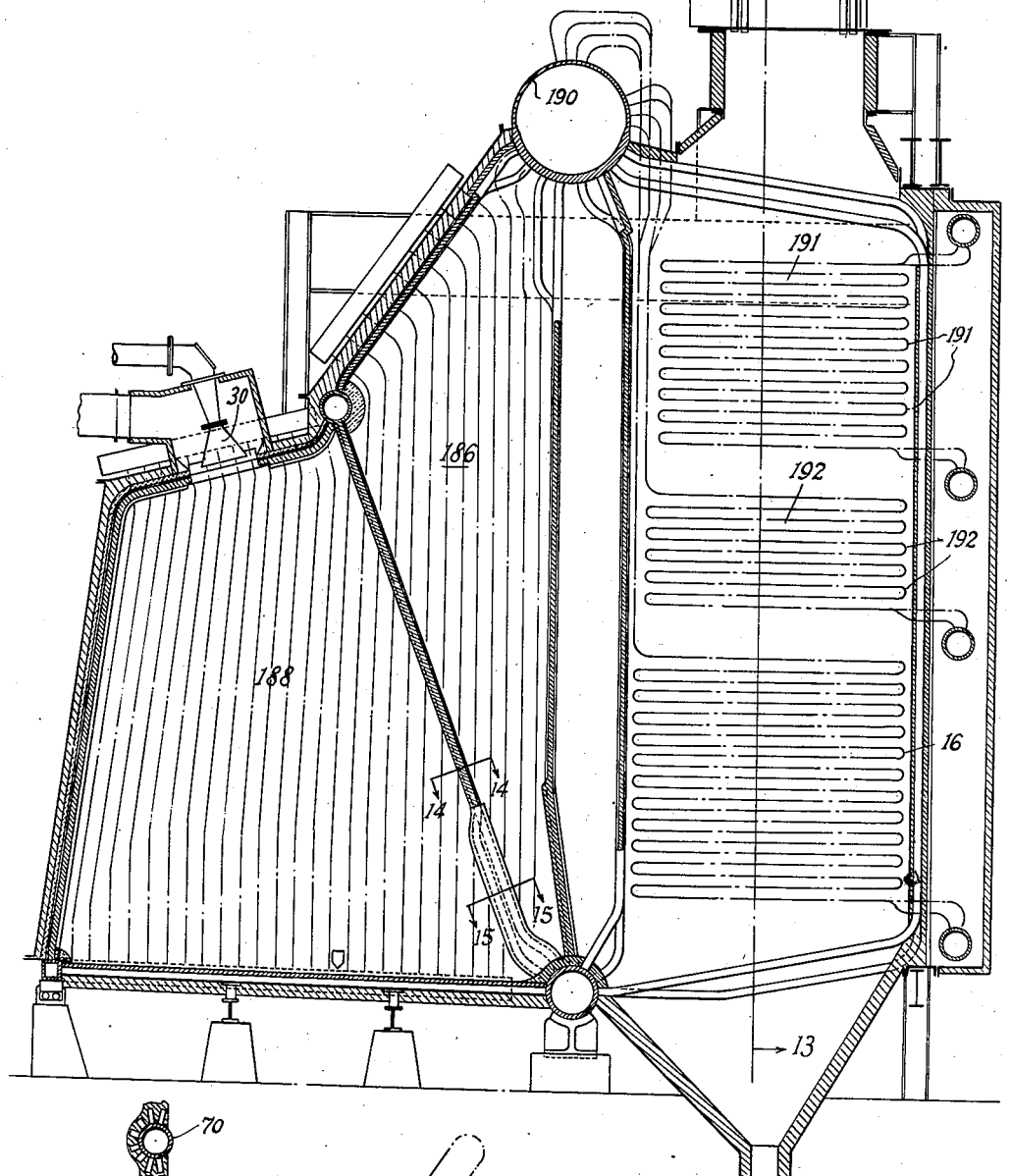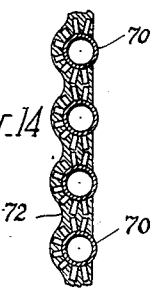

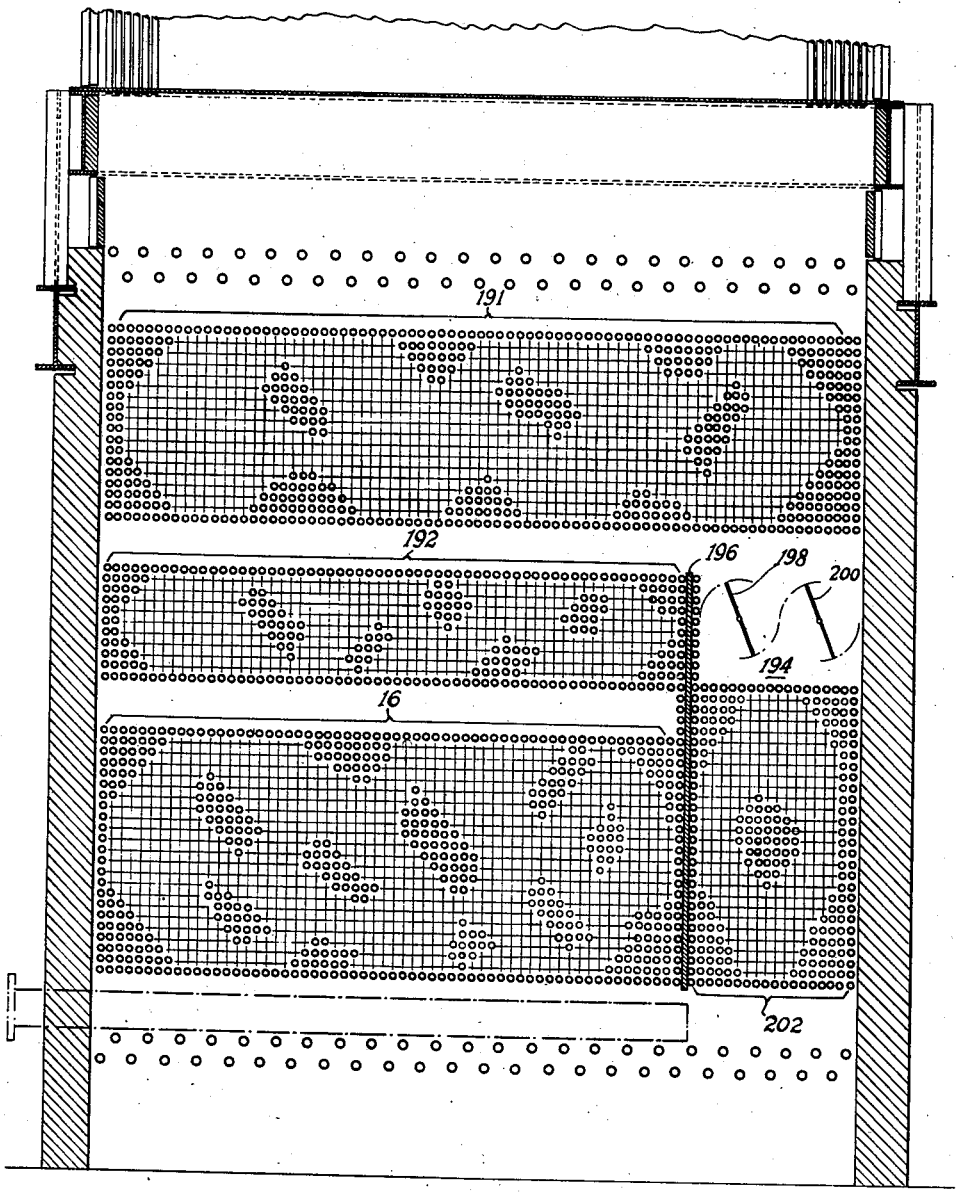

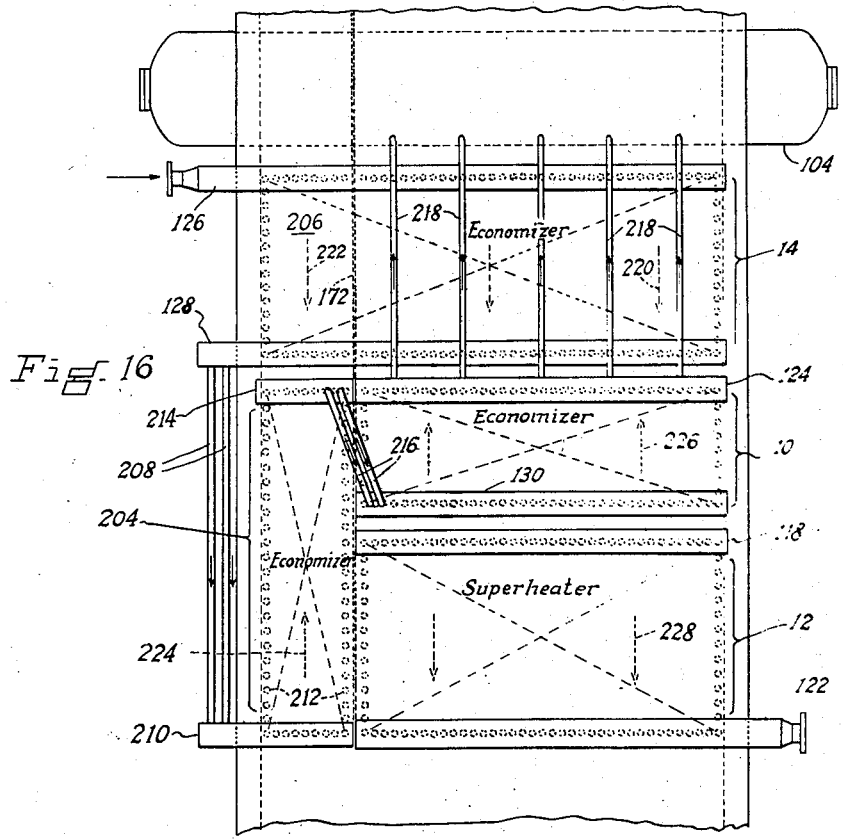

Patented Apr. 9, 1940

2,196,889

UNITED STATES PATENT OFFICE 2,196,889

STEAM GENERATOR

Ervin G. Bailey, Easton, Pa., assignor to The Babcock & Wilcox Company, Newark, N. J., a corporation of New Jersey Application July 1, 1936, Serial No. 88,285

22 Claims. (Cl. 122—235)

My invention relates to steam boilers. It is particularly concerned with steam boilers operating at high steam pressures and so associated with superheaters that high total steam temperatures are attained.

To attain a high superheat temperature of the order of 925° F. in high pressure boilers, the superheater must be contacted by furnace gases at temperatures higher than those required for boilers operating at lower pressures and temperatures, in order that a sufficient temperature differential between the gases and the metal shall be attained; otherwise the amount, or area of the superheating surface required for such high total temperatures, would be excessively great and costly. Furthermore, the impairment of the operation of such a superheater by accumulated slag is a major problem when slag forming fuels are burned in the boiler furnace. It has been suggested that such accumulations of slag upon the superheater surface could be prevented by the interposition of a large amount of convection heating surface in the form of a bank of water tubes between the furnace and the superheater, but such a surface would not serve the purposes of my present invention for the reason that its use would not only result in excessive cooling of the gases before they reach the superheating surface, but would also involve the accumulation of large amounts of slag upon the surface itself. I overcome these difficulties in a high pressure high temperature steam generating unit arranged so that a limited amount of water heating or steam generating surface is highly effective in (a) quenching the slag particles before they reach the closely spaced tubes of a high temperature superheater, and (b) concurrently reducing the furnace gas temperatures to the proper point for effective utilization of these gases by the superheater.

My invention comprehends steam boilers operating at pressures as high as 1400 lbs. per sq. in. At such a pressure the temperature of saturated steam is, approximately, 588° F., and when the total temperature of the steam supplied by such a boiler is of the order of 925° F., approximately 286 B. t. u.'s have been absorbed by each pound of steam supplied. This represents a high degree of energy which can be devoted to useful work and it is to be contrasted with the results obtained with a boiler operating at 600 lb. pressure with a total temperature of 725° F. In the latter case, each pound of steam at a total temperature of 725° F. has absorbed approximately 160 B. t. u.'s in the superheat. Thus, with my high temperature and high pressure boiler, by operating at the higher pressure and the higher total temperature mentioned, I have at least 70% more energy available from the superheat of the steam supplied.

In the boiler illustrating my invention I so associate a superheater and a steam generating portion of the boiler that their capacities are coordinated with the capacity of the boiler furnace and the total temperature of the steam is maintained close to the maximum limit imposed by the metal of the superheater or the metal of a turbine utilizing the steam, to attain a high overall efficiency.

It has been difficult to attain such high total temperatures because the temperatures of the furnace gases have been reduced by their contact with a convection heated bank of tubes located immediately forward of the superheater. With such arrangements the temperatures of the furnace gases contacting the superheater have been so reduced that an excessive amount of superheater surface would have to be installed to attain such high superheats as attained by the use of my illustrative boiler. I not only attain the desired high superheat without interposing a deep bank of convection heated tubes immediately forward of the superheater, but I am also able to accomplish this result even when pulverized coal is utilized as fuel in the boiler furnace. As a matter of fact, I eliminate the major portion of the suspension carried slag particles before the furnace gases reach a position immediately forward of the superheater, and I do this without using a deep bank convection section ahead of the superheater.

My invention is particularly applicable to high capacity boilers in which a major portion of the total steam is generated by heat radiantly transmitted to furnace wall tubes.

Among other objects of my invention there are; the attainment of high combustion efficiency with a minimum of ash collection upon tubes constituting a part of the convection surface of the boiler; a high recovery of ash in the furnace; high fluidity of ash to promote good slag tapping conditions; a low carbon loss due to effective mixing of the furnace gases at temperatures which support combustion; and the substantial elimination of boiler heating surfaces to shield a superheater from the radiant heat of the furnace.

These objects and others which will appear as this description proceeds, are attained by a boiler which does not present a large relatively cold secondary furnace and boiler convection bank.

Instead, it includes relatively small open passes defined largely by wall tubes and interposed in series relative to a superheater and the furnace. The walls of these open passes are preferably vertical and the wall defining tubes present metallic surfaces directly exposed to radiant heat. Consequently, the furnace gases and suspended slag particles, in these passes, are rapidly cooled. Slag from the first open pass will drop to the bottom where it will melt and run back into the primary furnace chamber. There is also a zone for dry ash removal located at the bottom of a second open pass and beneath a convection pass containing a superheater and an economizer. There is a by-pass in the convection pass, and superheat is controlled by the regulation of the gas flow through the by-pass.

Such a boiler is indicated in the accompanying drawings, in which:

Fig. 2 is a transverse vertical section on the line 2—2 of Fig. 1 showing a section of the furnace.

Fig. 3 is a vertical section taken on the line 3—3 of Fig. 1 and illustrating the arrangement of tubes and the provisions for superheat control in the convection section of the boiler.

Fig. 10 is a vertical section, showing the construction of the columns formed of boiler downcomers for supporting the drum 50.

Fig. 11 is a transverse section taken on the line 11—11 of Fig. 10 and showing the construction of the downcomer columns.

Fig. 12 is a view similar to Fig. 1 of an additional embodiment of the invention.

Fig. 13 is a vertical section taken on the line 13—13 of Fig. 12.

Fig. 14 is a horizontal section on the line 14—14 of Fig. 12, showing the wall tube construction which presents a ceramic refractory face to the primary furnace chamber and a metallic face to the first radiant heat absorption chamber.

Fig. 15 is a detail view showing the arrangement of the refractory covered screen tubes at the outlet of the primary furnace chamber, which is taken on the line 15—15 of Fig. 12.

Fig. 16 is a diagrammatic view in the nature of an elevation, showing the arrangement of economizer and superheater headers.

Fig. 17 is a view showing a second set of rollers for supporting the lower drum.

A steam boiler includes a heat release part in which fuel is burned, and a heat absorption part utilizing the released heat. Each of these parts must, of course, accomplish its own objectives, but, in an efficient boiler the actions of these parts must co-ordinate. For combustion to be most effective in releasing heat, combustion chamber temperatures must be as high as possible consistent with the capacity of the combustion chamber walls to resist damage by flames and furnace gases at high temperatures. Not only do high temperatures accelerate combustion but they make it possible to reduce the size of the combustion chamber necessary to effect complete combustion. When ash forming fuels are burned the desirable furnace temperature is above the fusion point of the ash, and when pulverized coal is used as a fuel the fusion of the ash takes place in suspension in the gases. Some of the resulting slag adheres to the walls of the furnace, some falls to the bottom of the furnace by gravity or by inertia due to change in direction of the gas stream, but there is always some of the suspension carried slag carried by the gases beyond the flames of the burning fuel.

Figure 1:
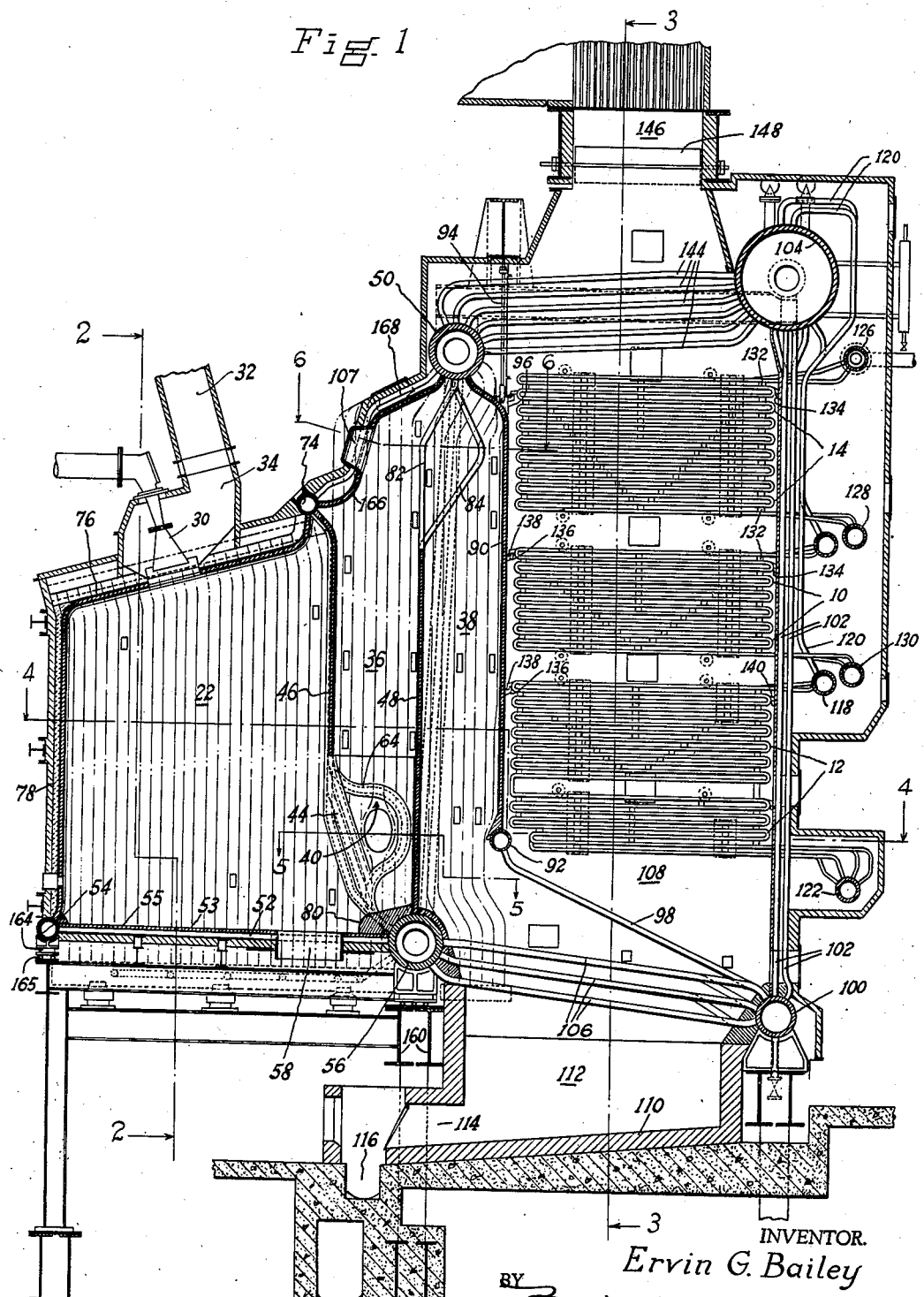
Fig. 1 is a sectional elevation of a steam boiler designed in accordance with the teachings of this invention.

For the most effective absorption of heat from furnace gases beyond the flames of the burning fuel, the illustrative boiler uses banks of tubes extending across the path of the furnace gases. Some of these tubes carry steam which is being superheated and they are represented in Fig. 1 of the drawings by the superheater 12. Fig. 12 shows a similar superheater 16. Other banks of tubes similarly positioned, form the economizers 10, 14, 191, and 192 of the boilers illustrated in Figs. 1 and 12 of the drawings, respectively. In order that the effectiveness of such tubes, and more particularly the lower tubes of the superheaters may be maintained at a maximum, they must be kept free of solid deposits on their gas sides. It is also necessary that the temperature of the furnace gases contacting the superheater tubes be within the allowable temperature range. The temperature of the gases must not be so high as to damage these tubes.

From the above considerations it will be seen that if the most effective co-ordination is to be obtained between the heat release part of the boiler and its heat absorptive part, it is necessary to lower the temperature of the furnace gases between the furnace and the superheater. In addition, when pulverized fuel is used and burned in a high temperature furnace, the gases leaving the furnace carry molten slag in suspension and this slag must have its temperature lowered so that it will solidify before it reaches any bank of convection heated tubes whether they contain water or steam. If this were not done the slag would freeze on the tubes of the bank and would reduce their heat absorbing capacity. Furthermore, such deposits would accumulate until the gas flow area between the tubes is reduced, or wholly closed. It is obvious that such action would not only result in a reduction of steam generating capacity and steam superheating capacity, but that, if the action continued, it would result in a shutdown of the boiler in order that a deslagging could be accomplished.

My invention comprehends a steam boiler having cooperating means for maintaining high furnace temperatures and for effectively lowering the temperature of the furnace gases beyond the furnace and the end of the flame to such a point that they will not damage the superheater. It also contemplates such lowering of the temperature of the gases that the slag in suspension will be solidified before it reaches the superheater, and this lowering of the temperature of the gases and the slag carried by those gases is accomplished without the interposition of a convection heated tube bank in front of the superheater. My invention is, therefore, particularly applicable to boilers in which pulverized coal is burned as a fuel.

Figure 8:
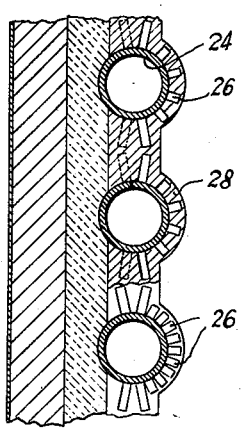
Fig. 8 is a horizontal section indicating the construction of the refractory faced wall of the ignition chamber of the furnace.

To maintain high furnace temperatures throughout a wide range of boiler operation, I provide a combustion and ignition chamber 22 of relatively small volume. This part of the furnace may also be referred to as a primary furnace chamber, or high temperature furnace chamber. As another feature which is conducive to high furnace temperatures, I provide the chamber 22 with walls which present non-metallic refractory faces to the burning fuel. Such a wall is illustrated in Fig. 8 of the drawings. It includes the wall tubes 24 provided with metallic studs 26 welded thereto and arranged over the furnace faces of the tubes for maintaining a ceramic refractory layer 28 which forms the furnace face. This refractory material is heated to incandescence during the operation of the furnace so as to continuously radiate heat to the gases and the burning fuel.

To further insure high furnace temperatures I employ fuel and air feeding and mixing equipment, preferably including the downshot burners 30 as indicated in Fig. 1 of the drawings. Secondary air is supplied to the burners through the piping 32 which communicates with the chamber 34 surrounding the burners. With such burning equipment I am able to effectively control the flame length so as to have the high temperature chamber filled with flame, and with such vertical firing I also obtain the advantages of more rapid and complete combustion, and a higher input per foot width of the furnace, and greater fluidity of ash for tapping. I am also thereby enabled to employ coals which have ash fusion temperatures as high as 2700° F. The combustion conditions which I thereby attain involve exceedingly high furnace temperatures in spite of the large amount of water cooling in the walls to protect them against damage, and I also attain thereby a correspondingly high furnace gas exit temperature. The stud tube and refractory wall of the high temperature chamber successfully withstands these high furnace temperatures, and the combustion portion of the furnace need not, therefore, be larger than is required for substantially complete combustion. The heat liberation in the high temperature chamber is so high that it brings the total heat liberation in the complete furnace (including the open passes) to 47,800 B. t. u. per cu. ft. per hour at normal boiler rating of 300,000 lbs. steam per hour.

Beyond the primary furnace chamber 22 I provide means for lowering the temperature of the gases flowing from that chamber to such a tube bank as that forming the superheater 12, and a predominant amount of the heat absorbed between the superheater and the chamber 22 is transmited to the walls of the intervening passages by gaseous radiation. Thus I am enabled to adopt, in the illustrative boiler, any form of tube bank most suitable for absorbing heat from the gases. The tube bank will not be damaged by reason of the excessive temperature of the gases, and the heat absorbing capacity of the tube bank will not be impaired by the accumulation of solid deposits upon the tubes of the bank.

For the utilization of gaseous radiation to cool the gases along their flow path between the flame end and the tube bank, I provide a passage of such length that the absorption of radiantly transmitted heat is promoted. The walls of these passages are preferably cooled by water tubes.

The furnace gases have constituents which radiate heat and the principal ones are carbon dioxide, water vapor and solid particles in suspension. These solid particles may be dust particles or ash particles in a solid or molten state, beyond the flame. The radiating constituents in the gases may also include carbon particles, or hydrocarbons in the flame.

Figure 4:
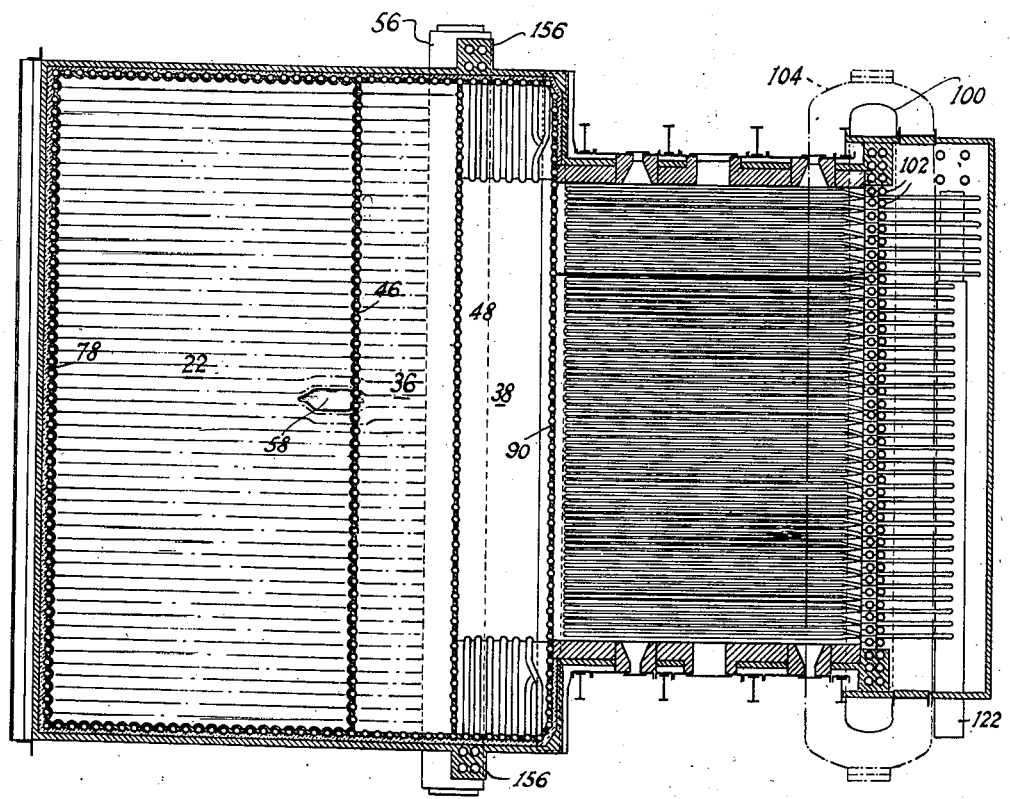
Fig. 4 is a horizontal section taken on the section line 4—4 of Fig. 1.

For a given content of such radiant heat constituents, and for a given temperature of the gases, a stream of gases will radiate heat to solids at a rate per square foot of wall that increases, within limits, with the mean thickness of the gas stream. Beyond a certain thickness the increase in rate of radiation is negligible and I therefore prefer to construct my boiler so that the thickness of the gas stream will be within this limit. I preferably construct the boiler so that the gas stream shall be of such cross-section and of sufficient length for that cross section to insure sufficient radiation from the gases to lower their temperature to the desired value before the gases reach the tube bank. Also, I preferably so form the boiler that the gas stream shall have a cross-sectional shape of large perimeter per unit of cross sectional area of the stream. I prefer that the gas stream shall be rectangular in cross section and that the rectangle representing that cross section shall have a length which is many times its breadth. I therefore arrange the walls of the gas cooling chambers or passages 36 and 38, so that they will have the rectangular cross section particularly indicated in Fig. 4 of the drawings. I also contemplate that the rate of radiant heat absorption may be increased in the chambers 36 and 38 by increasing the ratio of total perimeters of all sections to the flow area of these chambers. This may be done by providing a series of fluid cooled partitions (not shown) located across the rectangular chambers 36 and 38. Such construction would increase the radiation per foot of gas travel and make it possible to shorten that path, but with either of these forms of chambers for absorbing heat from the gases, I have provided chambers of sufficient length to produce the desired lowering of the gas temperatures by gas radiation. It is, of course, to be understood that the gas stream between the flame end and the first convection tube bank, is sweeping the water cooled walls of the gas cooling chambers and that the gases are consequently losing some heat by convection in addition to the heat which is lost by radiation, but I do not rely on such convection to adequately cool the gases, for reason that, to do so, would require abnormally long passages, or passages so narrow as to collect deposits from the solid fuels. Such collections would decrease the rate of heat transfer and impose excessively high draft losses.

To make the gas cooling passages 36 and 38 most effective, I provide means to limit radiation from the high temperature furnace chamber 22 to the gases in those ducts. This is also done for the reason that such radiation would limit the cooling of the gases in those ducts because the same constituents that radiate heat to the duct walls will absorb heat radiated to them. To this end I dispose the gas duct, or ducts, in such a way with reference to the gas exit from the chamber 22 as to minimize the size of the portion of the gas stream and the area of the duct wall subject to direct radiation from the chamber 22. This is illustrated by the construction shown in Fig. 1 of the drawings wherein the gas outlet 40 of the chamber 22 is at the bottom of that chamber where it is crossed by refractory covered screen structures such as those indicated at 42 and 44 in Fig. 5 of the drawings. These structures are formed by bending the tubes of the wall 46 so that they are grouped as shown. The outlet 40 is also arranged at the extreme lower end of the heat absorbing passage 36 and at the narrowest portion of that passage, and the passage 38 is shielded by the wall 48 from direct radiation heat from the chamber 22.

At the bottom of the chamber 22 of the furnace indicated in Fig. 1 of the drawings, I provide the furnace floor 53 which is cooled by the floor tubes 52 directly communicating with the header 54 and the drum 56 and connected through the latter into the fluid circulation of the boiler. This furnace floor is preferably covered with refractory material 55 so that molten slag may be maintained on the bottom of the furnace. The collected slag is discharged through the slag opening 58 to a subjacent slag pit (not shown).

Figure 5:
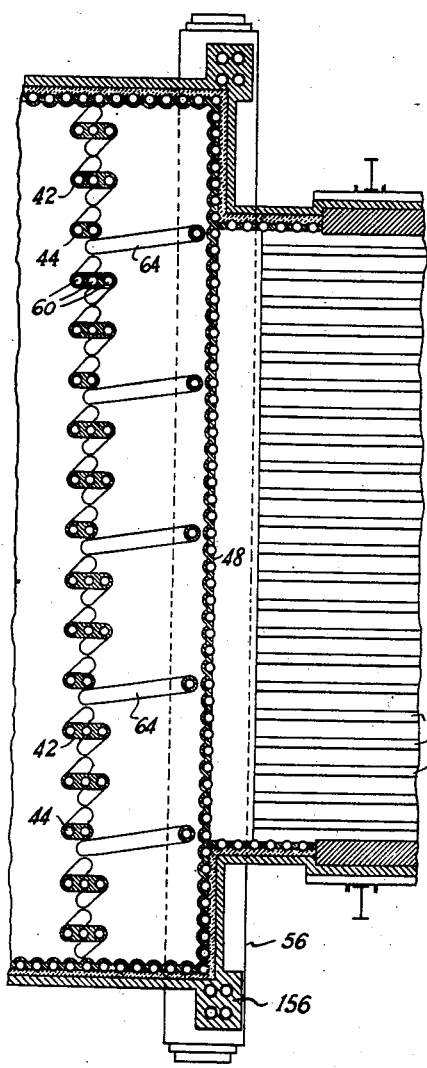
Fig. 5 is a partial horizontal section taken on the line 5—5 of Fig. 1 and illustrating the arrangement of tubes extending across the gas outlet of the furnace chamber.
Figure 6:
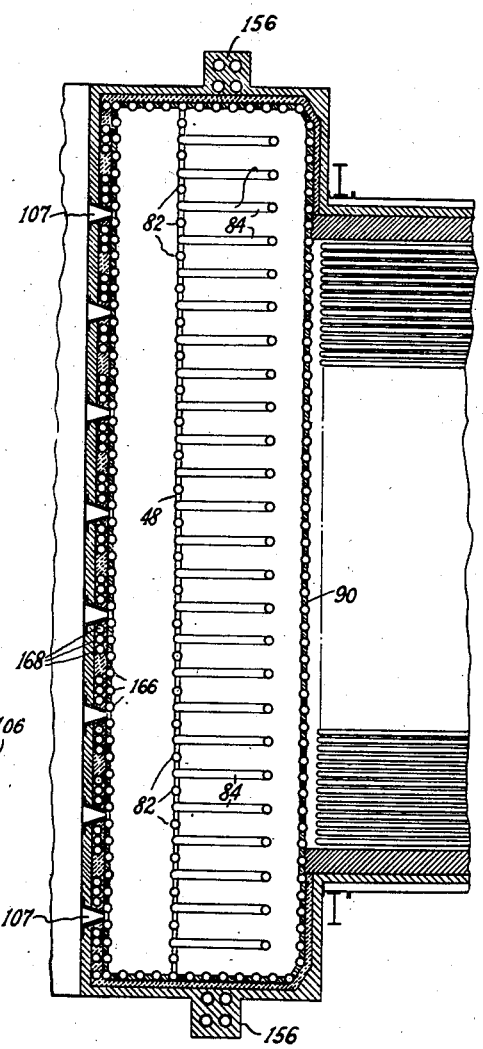
Fig. 6 is a partial section on the line 6—6 of Fig. 1 illustrating the arrangement of tubes in the gas mixing screen between the radiant heat absorption passages.
Figure 7:
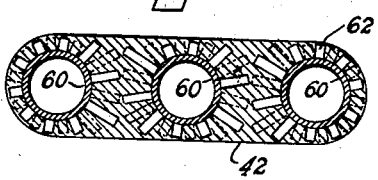
Fig. 7 is a transverse section through one of the slag screen baffles indicated in Fig. 5.

The action of the downshot burners 30 directing the gases toward the slag on the bottom of the furnace has the effect of minimizing the slag carried by the gases which emerge from the furnace chamber 22. The amount of slag particles in the gases entering the chamber 36 from the chamber 22 is also minimized by the action of the screen structures 42 and 44. As before stated, these structures are formed by extensions of tubes 60 defining the wall 46, and these extensions are provided with metallic studs 62 positioned as shown in Fig. 7 of the drawings and arranged to hold a refractory covering on the tubes. As a result of the high furnace temperatures this refractory is maintained in an incandescent and sticky condition. The structures 42 and 44 therefore have the effect of maintaining slag particles in a molten condition so that molten slag deposited on them will return by gravity to the slag opening 58 in the bottom of the chamber 22. To provide sufficiently wide gas passages between the structures 42 and 44, some of the tubes of the wall 46 have extensions 64 which are bent further out of their wall-forming alignment, as indicated in Figs. 1 and 5 of the drawings.

Because the furnace faces of the water tubes in the walls of the chamber 22 are preferably covered by a non-metallic refractory to minimize the heat losses and promote high furnace temperatures, and because it is important to promote rapid heat absorption by heat radiation from the gases to bare metal surfaces of the walls of the gas radiation duct 36, it is preferable that the wall 46 separating the chamber 22 and the duct chamber 36 have different face constructions on its opposite sides. Such wall construction is indicated in Fig. 14 of the drawings. It includes the tubes 70 presenting bare metal faces on one side of the wall and the non-metallic refractory face 72 on the opposite side of the wall. The wall on the latter side resists heat absorption and on the opposite side it promotes heat absorption. The refractory material closes the spaces between the tubes and it is held in place by the stud tube construction.

The tubes defining the wall 46 and the gas mixing screen extending across the outlet 40 of the primary furnace chamber 22 are shown communicating at their lower ends with the drum 56 and at their upper ends with a header 74. Other furnace wall tubes directly connect the headers 74 and 54 and extend along the roof 76 and the wall 78 of the primary furnace chamber. The remaining walls of this chamber are cooled by similarly arranged wall tubes communicating with upper and lower headers similarly connected into the fluid circulation of the boiler.

The slag maintained on the furnace floor 52 receives molten slag running down the furnace walls and it also receives slag particles directly from the gas cooling chamber 36. The change in direction of the gases in passing from the chamber 22 to the heat absorbing chamber (or gas radiation duct) 36 tends to separate slag particles from the gases by inertia. Some of these slag particles gather upon the screen structures 42 and 44 of the radiant heat screen tubes and on the lower portion of the wall 48 of the chamber 36. All of this slag will, in the illustrative boiler, flow into the slag opening 58 in the floor 53. Injury to the drum 56 and its tube connections by such flowing slag is prevented by a body of refractory material 80 covering a part of the drum.

Figure 9:
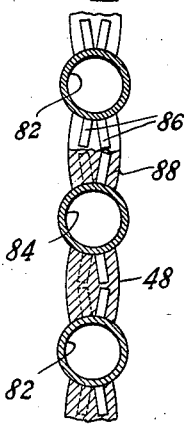
Fig. 9 is a partial horizontal section indicating the construction of the wall separating the radiant heat absorption passages.

The wall 48 includes tubes 82 and 84 directly communicating with the drums 50 and 56, the tubes 84 being bent out of their wall forming alignment at their upper ends so as to reduce draft losses as the gases pass from the gas cooling chamber 36 to the chamber 38. Below these bent portions of the tubes 84 the wall 48 is completed by metallic studs 86 and refractory material 88 (see Fig. 9) which close the spaces between the tubes. As indicated in Fig. 9 this refractory material leaves the sides of the tubes bare so that a high rate of heat absorption from the gases in the chambers 36 and 38 is promoted.

The rear wall 90 of the heat absorption chamber 38 may be of a construction similar to that of the wall 48 and it includes tubes directly communicating with the drum 50 and the header 92. The latter may be supported by the tubes of the wall 90 which are suspended from a part of the structural steel by rods 94 connected to plates 96 directly welded to the tubes. Water is supplied to the header 92 by the tubes 98 which communicate at their lower ends with the header 100. The latter is connected by a number of downtake tubes 102 with the water space of the steam and water drum 104 and circulatory connection between the header 100 and the drum 56 is maintained by the tubes 106 which extend beneath the downflow passage section 38 and the up-pass 108. The tubes 106 act upon all ash particles coming in contact therewith to cool them so that they may be accumulated for removal upon the sloping floor 110 of the hopper 112. Such accumulations of ash may be continuously or periodically removed by causing them to pass through the outlet 114 to the sluiceway 116.

With reference to the dry ash collection in the hopper 112, it is to be noted that the ash particles contained in the gases in the chamber 38 are proceeding downwardly toward the hopper. They will consequently be deposited to considerable extent by reason of their inertia and the amount of this deposit is increased by the turning of the gases into the up-pass 108, and by the effect of the tubes 106 and 98 at the turning zone of the gases.

Fig. 1 shows a superheater and economizer including banks of tubes extending across the flow of gases in the up-pass 108. The superheater and economizer sections are of the continuous tube type and are drainable. As shown, the superheater 12 has an inlet header 118 connected by tubes 120 to the steam space of the drum 104. From the header 118 the superheater tubes extend back and forth across the gas pass and are connected at their outlet ends to the header 122. An illustrative arrangement of the economizer sections and the superheater sections is particularly shown in Fig. 16 of the drawings. In this figure a part of the section 14 of the economizer and a separate economizer section 204 are located in the superheat control bypass 206 formed by one wall of the gas pass and the division wall 172. Feed water enters the header 126 and flows through the tubes of the economizer section 14 to the header 128. From one end of the header the flow is through the downtakes 208 to the header 210. From this header the water, or water and steam, flows upwardly through the looped tubes 212 to the header 214. From this header the flow is to the header 130 through the tubes 216. From the header 130 the water, or water and steam, flows upwardly through the tubes of the economizer section 10 to the header 124. The latter is connected to the drum 104 by the uptake tubes 218. At low loads the amount of gas sweeping the tubes of the economizer section 204 and that part of the section 14 in the bypass 206, is decreased, sufficient active economizer surface being provided by the section 10 and that part of the section 14 contacted by the furnace gases in the main part of the gas pass 108.

The arrows 220 and 222 indicate the downflow of water in the economizer section 14, and the arrow 224 indicates an up-flow of water in the economizer section 204. Similarly, the arrows 226 indicate an up-flow of water in the economizer section 10.

As indicated in Fig. 16 of the drawings, the header 122 is the outlet header for the superheater, the flow of steam being downward as shown by the arrows 228.

Both the superheater tubes and the economizer tubes are of small diameter, of the order of 2 inches O. D. They are also arranged in closely spaced relationship, the center to center spacing transversely of the gas pass being of the order of 3". The tube leg spacing longitudinally of the gas pass may be somewhat greater, but it is preferably not more than 4 in.

The successive loops of the superheater tubes and the economizer tubes are preferably united by metallic struts 132. Such struts may be used in the lower temperature zones but between the successive economizer tubes and superheater tubes in the higher temperature zones, that is to say, in the zones of the tubes first contacted by the furnace gases, the successive tubes are preferably connected by slip hanger constructions to compensate for the greater degree of expansion and contraction of these tubes. Such slip hanger constructions are illustrated in U. S. Patent 2,134,713, granted November 1, 1938. In any event the successive loops of the economizers and the superheater are so joined that they form vertically arranged flat coils. These coils are supported by lugs 134 welded to the tubes 102 at one side of the gas pass 108 and the lugs 136 welded to the tubes of the wall 90. Cooperating lugs 138 and 140 are welded to the upper loops of the superheater coils.

The furnace gases, after passing across the economizer and the superheater, pass across the circulators 144 which directly connect the drums 50 and 104. The flue 146 is positioned above the circulators 144 and the gas flow through this flue may be controlled by a series of dampers 148.

All of the above described tubes which connect the drum 56 to the drum 50 are uptake tubes delivering steam and water to the drum 50. The downtake tubes for the drums 50 and 56 are indicated particularly in Figs. 3, 10 and 11 of the drawings. These tubes 150 are of large diameter and they have thick walls as clearly indicated in Fig. 11. They are preferably arranged in groups of four at the opposite ends of the drums and they are connected by struts or lattice work 152 welded thereto, as indicated in the Fig. 11. They thus form columns which support the drum 50 from the drum 56. These columns are located outside of the boiler, and they are not in contact with the furnace gases. The tubes of each column are sheathed in insulating material 154.

Each of the columns 156, formed by the tubes 150 transmit a part of the load of the upper drum 50 to the lower drum 56 and thence to pedestals 158 supported by the beams 160 which constitute a part of the steel work for the boiler. The headers 54 and 100 are similarly supported by pedestals resting upon similar beams, and the pedestals, or saddles, for the header 54 and the drum 56 may be mounted upon rollers so that, as the tubes 106 and 52 expand longitudinally, no excessive stresses will be imposed upon the furnace or boiler parts. Figs. 1 and 10 show each pedestal 158 to be roller supported on beam 160 by two sets of rollers 162 and 163 arranged at right angles and similarly arranged rollers 164 and 165 support the header 54.

The drum 50 is directly connected to the header 74 by an inner row of tubes 166 and an outer row 168, and the spaces between the tubes 168 may be closed by a stud tube and refractory construction similar to that indicated in Fig. 9 of the drawings. Some of these spaces are left open so as to provide openings through which lance bars may be operated in case slag accumulates unduly on tubes 82 and 84. Such openings are indicated at 107. Doors, not shown in the drawings, normally close these openings.

Provision is made for the control of superheat by the provision of the gas by-pass flue by a vertical baffle 172 extending from front to rear, and parallel to the economizer and superheater tubes in the gas pass 108. Preferably, this baffle partitions off about 20 per cent of this gas pass to form the superheat control by-pass 206. The by-pass 206 formed by this baffle may contain a lower economizer section 204 preferably connected in series with the upper counter-flow economizer 14 and the intermediate parallel flow economizer 10. The lower economizer 204 is preferably also a parallel flow economizer. The superheat is controlled by regulating the end dampers 178 and 180 of the damper set 148 which are installed at the top of the by-pass. The dampers 178 and 180 are intended to be open at full boiler load so that the maximum amount of furnace gases will pass over the lower economizer 204, and at low load they may be closed.

The embodiment of the invention indicated in Figs. 12 and 13 of the drawings is similar in many respects to the embodiment indicated in Fig. 1 but it differs therefrom in providing an upwardly expanding gas cooling chamber 186. It also presents a downwardly expanding primary furnace chamber 188, and it eliminates one of the upper drums, the drum 190 being substituted for the drums 50 and 104. The upper counterflow section 191 of the economizer extends entirely across the gas pass whereas the intermediate and parallel flow section 192 extends only over that part of the gas pass outside of the by-pass 194. This by-pass is formed by the vertical baffle 196 which preferably does not extend through the section 191. Superheat control is effected by regulation of the dampers 198 and 200. In the by-pass there is located a lower and parallel flow economizer section 202. The superheater 16 extends across that part of the gas pass outside of the by-pass.

Considering again the operation of the boiler illustrating my invention, it will be understood that a considerable portion of the released heat is absorbed before the furnace gases meet the banks of convection tubes, and that heat absorption takes place in two stages. During combustion, that is, from the time of fuel ignition until the time when combustion is complete, and from the point of ignition to the end of the flame along the gas flow path, heat being absorbed by the furnace walls may be mainly transmitted by flame radiation. In addition, from the end of the flame up to the tube bank along the gas flow path, heat is being absorbed by the gas pass walls, mainly by gas radiation.

Normally, steam boilers are operated over a considerable range of load and gas temperature change. With the use of the illustrative boiler good operating conditions are maintained over a wider load range than is otherwise possible, especially in slag tap furnaces fired with pulverized coal. In such furnaces there is some fraction of the maximum load at which the heat release rate is too low to permit the slag to melt for removal in liquid form. The hotter the furnace at full load the smaller the fractional load that can be carried without interruption of molten slag removal. This is accomplished when the water wall boundary area is a minimum for the furnace volume and for a given flame length, as provided in the illustrative boiler.

The illustrative boiler may be so designed that at full load the flame does not extend beyond the primary furnace chamber into the first section of the gas radiation duct or chamber, but, in any event, the gas cooling duct should be made long enough for its cross-section shape to insure sufficient cooling of the gases by gas radiation before the tube bank is reached. Under these conditions, and at light load, the end of the flame recedes toward the burner ignition zone entirely out of the gas cooling duct into which the flames extend at full load, but furnace temperatures will still be maintained desirably high.

Under normal operating conditions the temperature of the furnace gases at the outlet of the chamber 22 of the boiler shown in Fig. 1 of the drawings is about 2880° F. Under the same conditions the gases contact the lower tubes of the superheater at a temperature of the order of 2250° F., this cooling of the gases having been accomplished by transmission of radiant heat therefrom to the walls of the gas cooling ducts or chambers. The temperature of the gases is still high enough to produce a sufficiently high total temperature without necessitating an excessive amount of superheating surface. Even with the relatively small amount of superheater surface indicated in the drawings, superheats in excess of 900° F. may be obtained.

Another characteristic of the illustrative boiler, more particularly the boiler indicated in Fig. 1 of the drawings, is the relatively large proportion of the total heat absorbed in the superheated steam. Considering that the heat absorbed in vaporizing the water at the temperature of saturation, and the heat of superheating as combined constitute a total, or 100 per cent of the heat absorbed, a percentage as high as 31.5 per cent of this total heat is absorbed in the superheating.

I claim:

1. In a steam boiler having a furnace for the combustion of a slag forming fuel, the combination of wall cooling tubes defining a U-shaped passage for the flow of fuel undergoing combustion; the construction and arrangement of the tubes being such that the legs of the U extend upwardly and the base of the U extends along the bottom of the furnace; means for introducing a slag forming fuel and air at the upper part of one of the legs of the U-shaped passage; an outlet for the furnace gases at the upper end of the other leg of the U-shaped passage, means beneath both of the legs of said passage for collecting slag in a molten condition; means forming a second U-shaped passage the inlet of which communicates with the outlet of the first mentioned U-shaped passage; means for chilling the remaining slag particles as they pass through the second U-shaped passage, means at the base of the second U-shaped passage for separately collecting the chilled slag particles and other ash in a relatively dry form; and a convection heat absorption section consisting of fluid heat exchange tubes extending into the path of the gases as they flow upwardly from the base of the second U-shaped passage.

2. In a water tube steam boiler installation, a multiple stage furnace, tubes defining the walls of the first furnace stage, non-metallic refractory material covering said tubes and held in place thereby so as to form a refractory lining for the first furnace stage, means for burning pulverized fuel in the first stage of the furnace, means providing for the removal of molten slag deposited on the floor of the first stage of the furnace, an upright furnace wall separating the two stages of the furnace and including water tubes which are covered with ceramic refractory material which forms the furnace face of the high temperature stage of the furnace and presenting bare tube areas on their opposite sides presented toward a much lower temperature furnace stage, other wall tubes connected into the boiler circulation and cooperating with the first mentioned wall to define the low temperature stage in which the gases flow upwardly from the first stage, said other tubes presenting bare tube surfaces to the furnace gases, and means presenting convection heated fluid heating surface exposed to the furnace gases beyond the second furnace stage.

3. In a water tube steam boiler installation, a multiple stage furnace, means for burning a slag forming fuel in a high temperature stage of the furnace, means for maintaining slag in a molten condition at the bottom of the high temperature stage, fluid cooled wall tubes separating the high temperature stage from the low temperature stage and so arranged that the residual solids of combustion collect in the bottom of the high temperature stage from both stages of the furnace, other wall tubes cooperating with the first mentioned wall to form a second combustion chamber in which the furnace gases flow upward in the second stage, and spaced tubes forming convection heated fluid heating surface exposed to the furnace gases beyond the second stage, some of said other wall tubes screening the convection surface from radiant heat from the second combustion chamber.

4. In a steam boiler, a furnace including a primary combustion chamber in which substantially all of the absorbed heat is radiantly transmitted to wall tubes defining said chamber and connected into the boiler circulation, means providing for the burning of fuel in said chamber, ceramic refractory material anchored to said wall tubes and lining said chamber so as to promote by its incandescence and re-radiation high ignition and combustion temperatures, means including wall tubes delineating a secondary combustion chamber in which the furnace gases pass upwardly from an outlet at the lower part of the primary chamber, substantially all of the heat absorbed in the secondary chamber being radiantly transmitted to said wall tubes, other wall tubes connected into the boiler circulation and arranged to define a gas pass in which furnace gases pass downwardly from an outlet at the top of the secondary combustion chamber, means forming a dry ash receiving zone at the base of said down-pass, means defining an up-pass communicating with the down-pass near said zone, and tubes forming parts of the boiler heating surfaces and extending transversely of the up-pass and across the path of the gases in said up-pass.

5. A steam boiler comprising, in combination, wall tubes connected into boiler circulation and defining a primary combustion chamber, means for effecting high temperature combustion of a slag forming fuel in said combustion chamber, means including some of said tubes and defining a secondary combustion chamber in which substantially all of the heat absorbed is radiantly transmitted to wall tubes connected into the boiler circulation, slag particles carried in suspension in the furnace gases in the secondary chamber being separated for removal before the gases leave that chamber, a slag screen positioned at the turn of the gases from the primary combustion chamber into the secondary combustion chamber, a convection section, and wall tubes defining a radiant heat absorption chamber interposed relative to the secondary combustion chamber and the convection section, the furnace gases turning as they enter the absorption chamber from the secondary combustion chamber and the gases and their suspension carried solid particles being further cooled by the walls of the absorption chamber, substantially all of the heat absorbed in the absorption chamber being radiantly transmitted to the walls thereof.

6. A steam boiler including, wall tubes defining a furnace burning a slag forming fuel, a convection section including fluid containing tubes extending into the path of furnace gases, and means including wall tubes forming intervening gas passes in which substantially all of the absorbed heat is radiantly transmitted to the wall tubes defining those passes, the intervening passes including an up-pass leading from the furnace and a down-pass leading to the gas inlet at the base of the convection section, the front and rear walls of both of said passes being relatively narrowly spaced so as to promote effective radiant transmission of heat from the furnace gases and their suspended solids.

7. In a steam boiler, a furnace, an upper drum, steam generating tubes exposed to the heat of the furnace gases and communicating with the drum, downtake tubes shielded from the furnace gases and connected to the drum in groups with one group at each end of the drum, and means connecting the tubes of each group so that they act as column supports for the drum.

8. In a steam boiler having a furnace for the burning of a slag forming fuel, fluid cooled tubes defining a combustion chamber and an outlet to a secondary combustion chamber near the base of said chambers, means for introducing a slag forming fuel into the upper part of the first combustion chamber and burning the same in suspension in a path in which the gases flow down in the first combustion chamber and then flow upwardly through the secondary combustion chamber, the heat absorbing means along the walls of said first combustion chamber having their heat absorbing surfaces so constructed and so coordinated with combustion conditions as to maintain a normal mean temperature higher than the ash fusion temperature of the fuel, wall cooling tubes defining a U-shaped passage the inlet of which communicates with an outlet at the top of the secondary combustion chamber, the heat absorbing walls of the U-shaped passage constructed to maintain the normal mean temperature lower than the ash fusion temperature of the fuel burned, means at the mid-portion of the second U-shaped passage for the removal and collection of chilled slag particles and other ash in a dry condition, the bottoms of said combustion chambers being constructed to maintain slag particles depositing thereon in a molten condition, and a convection heat absorption section consisting of fluid heat exchange tubes extending into the path of the gases in the outlet leg of the U-shaped passage.

9. In a steam boiler and its furnace, means for introducing a slag forming fuel into the combustion chamber of the furnace, a convection section including fluid containing tubes in the path of the gases, and fluid cooled wall tubes connected into the boiler circulation and arranged to form a plurality of radiant heat absorption passages communicating with the outlet of the combustion chamber and the convection section, one of said passages directing furnace gases downwardly toward the inlet of the convection section at the lower part of the installation, means at the base of the combustion chamber and below the first of said passages for accumulating and maintaining slag deposited from the furnace gases in a molten condition, and means at the base of the other passage and the convection section for accumulating ash and chilled slag particles in a relatively dry state.

10. A two stage radiant boiler comprising, in combination, a high temperature combustion chamber of relatively small volume affording a locus for the first stage, wall tubes defining the sides and roof of the combustion chamber, other upright wall tubes of greater length than the first and defining a radiant heat absorption chamber of the second stage, the latter chamber being of greater height than the combustion chamber, a steam and water separator at the upper portion of the second stage, said wall tubes acting as risers communicating with the separator, an upper header receiving the discharge from the tubes of a plurality of walls of the combustion chamber, additional tubes acting as risers from said header and communicating with the separator, said other tubes being disposed at one side of the second stage, means supported by the combustion chamber wall tubes and affording a ceramic refractory lining for the combustion chamber, means for burning fuel at high rates in the combustion chamber, and a convection section contacted by the furnace gases passing from the second stage.

11. In a steam generator of large capacity, a bank of superheater tubes so closely spaced that any substantial accumulation of slag thereon would obstruct the gas passages between adjacent tubes and seriously impair the operation of the superheater, the capacity of the generator and the attained superheat being such that a high temperature differential between the superheater contacting gases and the superheater metal must be maintained to avoid the necessity of providing excessively extensive superheater surface, a high temperature pulverized coal burning furnace including steam generating wall tubes defining a combustion chamber, a burner, a refractory lining in all zones of the combustion chamber, said lining being supported by the wall tubes and held in position thereon, the burner and said lining co-operating to maintain furnace temperatures above the temperture at which the ash runs, and means between the combustion chamber and the superheater providing a radiant heat absorption zone in which the gases and their suspended solids are cooled to such an extent that there will be no excessive slag deposits on the superheater tubes, said means including a gas passage having wall cooling tubes on all sides, said cooling in the radiant heat absorption zone eliminating the necessity of providing an intermediate bank of tubes.

12. In a steam generator, a bank of closely spaced convection heated tubes causing an appreciable draft loss, wall cooling tubes defining a combustion chamber of relatively small volume, a nonmetallic refractory lining for said chamber supported by the wall tubes, said lining completely covering the furnace sides of said tubes, pulverized fuel burning means associated with said chamber and co-operating with the refractory lining to maintain furnace temperatures above the running temperature of the ash at the ash disposal position, means including a second furnace stage between said bank of tubes and the outlet of said chamber acting to so absorb heat radiantly transmitted by the gases and their suspended solids that the latter will not excessively accumulate upon the tubes of said bank, said second stage including wall tubes other than the first mentioned wall tubes and co-operating with some of the latter to define a radiant heat absorption chamber the walls of which present bare metal surfaces to the furnace gases, and refractory material closing the spaces between the second stage wall tubes, some of said wall tubes together with the refractory material associated therewith forming solid wall means so positioned as to completely shield the convection heated tubes from radiant heat transmitted from the combustion chamber.

13. In a method of generating and superheating steam, effecting the combustion in a first stage at such high temperatures that the disposal of the ash takes place while it is in a running condition, absorbing heat radiantly transmitted by reason of the combustion and utilizing such heat to generate steam in wall tubes defining said stage, simultaneously promoting the high temperatures of said stage by maintaining non-metallic refractory surfaces bounding said stage, maintaining a layer of molten ash in the lower part of said stage, causing the flames of said combustion to touch and sweep said layer of molten ash under normal operating conditions, the furnace gases passing from the first stage at substantially the level of said layer, superheating steam by convection heat exchange in a third stage by exposing a bank of closely spaced superheater tubes to the heat of the furnace gases at such high temperatures that there is a large temperature differential between the heat transmitting products and the steam, and maintaining a second stage in which the temperature of the furnace gases and their suspended solids from the first stage are substantially decreased, this temperature decrease being effected without exposure of the gases and their suspended solids to the cooling effect of a bank of convection heated tubes, some of said solids being separated out in the second stage and the remaining solids so affected that they will not accumulate upon and clog the superheater.

14. A steam boiler including, wall tubes defining a furnace burning a slag forming fuel, a convection section including fluid containing tubes extending into the path of furnace gases, means forming a transition zone in which substantially all of the absorbed heat is radiantly transmitted to wall tubes defining that zone, the transition zone leading from the furnace outlet to the gas inlet at the base of the convection section, the front and rear walls of the transition zone being spaced so as to promote effective radiant transmission of heat from the furnace gases and their suspended solids, means constituting a primary ash collection zone in which molten ash may be received from the furnace, means forming a secondary dry ash collection zone so arranged with reference to the transition zone and the convection section that solid particles dislodged from the convection section will fall by gravity into the secondary zone without passing counter-current to the gases in the transition zone for any substantial distance.

15. A steam boiler including, wall tubes defining a furnace burning a slag forming fuel, a convection section including fluid containing tubes extending into the path of furnace gases, means forming a transition zone in which substantially all of the absorbed heat is radiantly transmitted to wall tubes defining that zone, the transition zone leading from the furnace outlet to the gas inlet at the base of the convection section, the front and rear walls of the transition zone being spaced so as to promote effective radiant transmission of heat from the furnace gases and their suspended solids, means constituting a primary ash collection zone beneath the furnace and the transition zone in which collection zone molten ash may be received from the furnace and also from a part of the transition zone, means forming a secondary dry ash collection zone beneath the convection section and part of the transition zone so arranged with reference to the transition zone and the convection section that solid particles dislodged from the convection section will fall by gravity into the secondary zone without passing counter-current to the gases in the transition zone for any substantial distance, said secondary ash collection zone also receiving a part of the solids deposited from suspension in the gases in a part of the transition zone.

16. A furnace for burning finely divided solid fuel comprising vertically disposed front, rear and side walls defining the furnace chamber, means forming a transverse baffle extending between and terminating above the bottom of said furnace chamber to separate a front downflow passage and a rear upflow passage communicating at their lower ends, means for burning finely divided solid fuel in suspension in said downflow passage, said furnace chamber bottom below said downflow and upflow passages being constructed to receive and support slag in a molten condition, heat absorbing surface lining the sides of said downflow passage and constructed to maintain a normal mean temperature therein higher than the fuel ash fusion temperature whereby ash particles separating in said downflow passage will collect on the bottom thereof in a molten condition, heat absorbing surface lining the sides of said upflow passage and constructed to maintain a normal mean temperature therein lower than in said downflow passage, means arranged to form a pervious fluid cooled screen extending between the lower end of said baffle and said furnace bottom and arranged to permit the passage of molten slag depositing on the bottom of said upflow passage to the bottom of said downflow passage, and a slag discharge opening at the bottom of said downflow passage for the discharge of molten slag f om both of said passages.

17. A steam generator comprising a setting including a furnace chamber and a convection section spaced laterally from the furnace chamber, a vertically disposed substantially unobstructed connecting passage having a horizontal cross-sectional area substantially smaller and of narrower lateral width than said furnace chamber and having its opposite ends connected to said furnace chamber and convection section respectively, means for burning finely divided solid fuel in suspension in said furnace chamber at a normal mean temperature therein above the fuel ash fusion temperature, said furnace chamber having a substantially closed bottom constructed to receive and support slag in a molten condition, a steam and water separator, steam generating surface connected to said steam and water separator and comprising radiantly heated tubes defining walls of said furnace chamber and connecting passage, a bank of fluid heating tubes in the path of the gases flowing through said convection section, means forming an ash pit below said convection section, and an outlet at said furnace chamber bottom for the discharge of molten slag separated in said furnace chamber.

18. A steam generator comprising a setting including a furnace chamber and a convection section spaced laterally from the furnace chamber, a vertically disposed substantially unobstructed connecting passage having its opposite ends connected to said furnace chamber and convection section respectively, means for burning finely divided solid fuel in suspension in said furnace chamber at a normal mean temperature therein above the fuel ash fusion temperature, a substantially closed floor forming the bottom of said furnace chamber and the connecting end of said connecting passage and constructed to receive and support slag in a molten condition, an upper steam and water separator, steam generating surface for said generator connected to said steam and water separator and consisting substantially solely of radiantly heated tubes defining walls of said furnace chamber and connecting passage, a bank of horizontally arranged fluid heating tubes in the path of gases flowing vertically through said convection section, means forming an ash pit below said convection section, and an outlet at said furnace chamber bottom for the discharge of molten slag deposited on said floor.

19. A steam generator comprising a setting including a furnace chamber and a convection section spaced laterally from the furnace chamber an inverted U-shaped substantially unobstructed connecting passage having adjoining upflow and downflow sections with their lower ends connected to the lower portions of said furnace chamber and convection section respectively, means for burning fuel in suspension in said furnace chamber, steam generating surface comprising radiantly heated tubes defining vertical walls of said furnace chamber and connecting passage, and a bank of horizontally arranged steam superheating tubes extending across said convection section adjacent its connection to said downflow section.

20. A steam generator comprising a setting including a furnace chamber and a convection section spaced laterally from the furnace chamber, an inverted U-shaped substantially unobstructed connecting passage having upflow and downflow sections with their lower ends connected to the lower portions of said furnace chamber and convection section respectively, means for downwardly introducing and burning fuel in suspension in said furnace chamber, an upper steam and water drum, a lower water drum, steam generating surface consisting substantially only of rows of vertically disposed radiantly heated tubes connected to said upper and lower drums and defining substantially all of the walls of said furnace chamber and connecting passage, said connecting passage having a higher ratio of heat absorbing surface to gas flow area than said furnace chamber, conduit means for supplying water from said upper drum to said radiantly heated tubes, and a bank of horizontally arranged steam superheating tubes in the lower part of said convection section.

21. The method of burning finely divided solid fuel and removing the ash constituents of the fuel which comprises introducing a stream or finely divided solid fuel and air for combustion into the upper end of and burning the fuel in suspension while passing downwardly through a furnace chamber, maintaining a normal mean furnace temperature in said furnace chamber above the fuel ash fusion temperature, whereby ash separating out therein will be in a molten condition, collecting the ash separating in the furnace chamber in the bottom thereof and removing the same in a molten condition, directing the heating gases leaving the furnace chamber downwardly through an elongated substantially unobstructed vertical gas passage and cooling the gases while therein mainly by radiation to the walls thereof to a temperature below the fuel ash fusion temperature, whereby ash passing out of the outlet end thereof will be in a dry condition, collecting the ash particles leaving the gas passage at the outlet end thereof and removing the ash in a dry condition, and then passing the heating gases in contact with fluid heating surface in the path of the gases.

22. The method of burning finely divided solid fuel and removing the ash constituents of the fuel which comprises introducing a stream of finely divided solid fuel and air for combustion into the upper end of and burning the fuel in suspension while passing downwardly through a furnace chamber, maintaining a normal mean furnace temperature in said furnace chamber above the fuel ash fusion temperature, whereby ash separating out therein will be in a molten condition, directing the heating gases leaving the furnace chamber upwardly through a substantially unobstructed gas passage and cooling the gases while therein mainly by radiation to the walls thereof, collecting the ash separating in the furnace chamber and upflow passage in the bottom of the furnace chamber and removing the same in a molten condition, directing the heating gases leaving the upflow gas passage downwardly through a second vertical gas passage and cooling the gases while therein mainly by radiation to the walls thereof to a temperature below the fuel ash fusion temperature, whereby ash passing out of the lower end thereof will be in a dry condition, collecting the ash particles separating out in the downflow gas passage below the bottom thereof and removing the ash in a dry condition, and then passing the heating gases in contact with fluid heating surface in the path of the gases.

ERVIN G. BAILEY.